(12) United States Patent
Feng et al.

(10) Patent No.: US 9,002,694 B2
(45) Date of Patent: Apr. 7, 2015

(54) VERIFICATION OF DESIGN DERIVED FROM POWER INTENT

(75) Inventors: Xiushan Feng, Austin, TX (US); Jayanta Bhadra, Austin, TX (US); Scott R. Little, Hillsboro, OR (US)

(73) Assignee: Freescale Semiconductors, Inc., Austin, TX (US)

( * ) Notice: Subject to any disclaimer, the term of this patent is extended or adjusted under 35 U.S.C. 154(b) by 470 days.

(21) Appl. No.: 13/463,034

(22) Filed: May 3, 2012

(65) Prior Publication Data

US 2013/0297280 A1    Nov. 7, 2013

(51) Int. Cl.
G06F 17/50 (2006.01)
G06F 1/32 (2006.01)

(52) U.S. Cl.
CPC ........ *G06F 17/5036* (2013.01); *G06F 17/5022* (2013.01); *G06F 1/3203* (2013.01); *G06F 2217/78* (2013.01)

(58) Field of Classification Search
None
See application file for complete search history.

(56) References Cited

U.S. PATENT DOCUMENTS

| | | | | |
|---|---|---|---|---|
| 5,925,134 A * | 7/1999 | Solomon | | 713/324 |
| 6,157,903 A * | 12/2000 | Hu | | 703/14 |
| 6,275,969 B1 * | 8/2001 | Lakshminarayana et al. | | 716/133 |
| 7,260,732 B1 * | 8/2007 | Bittner, Jr. | | 713/324 |
| 7,770,142 B1 * | 8/2010 | Shmayovitsh et al. | | 716/109 |
| 7,954,078 B1 * | 5/2011 | Wang et al. | | 716/127 |
| 8,108,194 B2 * | 1/2012 | Zhu et al. | | 703/14 |
| 8,108,850 B2 * | 1/2012 | Chang et al. | | 717/156 |
| 8,352,235 B1 * | 1/2013 | Lin et al. | | 703/18 |
| 8,448,112 B1 * | 5/2013 | Kashai et al. | | 716/109 |
| 8,516,422 B1 * | 8/2013 | Wang et al. | | 716/109 |
| 8,812,286 B1 * | 8/2014 | Lin et al. | | 703/18 |
| 2003/0227281 A1 * | 12/2003 | Nguyen | | 323/282 |
| 2004/0172603 A1 * | 9/2004 | Collmeyer et al. | | 716/1 |
| 2006/0129957 A1 * | 6/2006 | Huang et al. | | 716/4 |
| 2007/0226741 A1 * | 9/2007 | Seshadri | | 718/103 |
| 2007/0245285 A1 * | 10/2007 | Wang et al. | | 716/10 |
| 2007/0300214 A1 * | 12/2007 | Chang et al. | | 717/153 |
| 2008/0071513 A1 * | 3/2008 | Chickermane et al. | | 703/15 |
| 2008/0313548 A1 * | 12/2008 | Krzyzanowski | | 715/748 |
| 2009/0089725 A1 | 4/2009 | Khan | | 716/106 |
| 2009/0271167 A1 * | 10/2009 | Zhu et al. | | 703/14 |
| 2011/0197172 A1 * | 8/2011 | Yamamoto et al. | | 716/111 |
| 2013/0232460 A1 * | 9/2013 | Kavalipati et al. | | 716/112 |
| 2013/0338991 A1 * | 12/2013 | Lin et al. | | 703/14 |

OTHER PUBLICATIONS

Yu et al., "Assertion-Based Power/Performance Analysis of Network Processor Architectures," Ninth IEEE International High-Level Design Validation and Test Workshop, Nov. 2004, 6 pages.

(Continued)

*Primary Examiner* — Kibrom K Gebresilassie (74) *Attorney, Agent, or Firm* — VanLeeuwen & VanLeeuwen; Jonathan N. Geld (57) ABSTRACT

An approach is provided in which a power design verification system retrieves a power intent data corresponding to a power design, which identifies the power design's power modes and power mode transition conditions. The power design verification system selects one of the power mode transition conditions, which identifies input signals that invoke a transition from a first power mode to a second power mode. In turn, the power design verification system generates simulation stimuli based upon the identified input signals and simulates the power design utilizing the generated simulation stimuli accordingly.

14 Claims, 9 Drawing Sheets

(56) References Cited

OTHER PUBLICATIONS

Komar et al., "Formal Validation of Low-Power Designs," Cadence Design System, Inc., Sep. 2007, 9 pages.

Gurevich et al., "Sequential Abstract State Machines Capture Sequential Algorithms," ACM Transactions on Computational Logic, vol. 1, No. 1, Jul. 2000, pp. 77-111.

Carlin et al., "Optimizing Area and Power Using Formal Methods," Design and Verification Conference & Exhibition, Feb. 2011, 6 pages.

Bembaron et al., "Low Power Verification Methodology Using UPF," Design and Verification Conference & Exhibition, Feb. 2009, pp. 228-233.

Hazra et al., "Leveraging UPF-Extracted Assertions for Modeling and Formal Verification of Architectural Power Intent," 2010 $47^{th}$ ACM/IEEE Design Automation Conference (DAC), Jun. 2010, pp. 773-776.

Khan et al., "Power Assertions and Coverage for improving quality of Low Power Verification and closure of Power Intent," Design and Verification Conference & Exhibition, Feb. 2008, 6 pages.

\* cited by examiner

VERIFICATION OF DESIGN DERIVED FROM POWER INTENT

TECHNICAL FIELD

The present disclosure relates to verifying a design utilizing simulation stimuli and assertions generated from power modes and transition conditions included in power intent data.

BACKGROUND

Power intent data describes a device's power architectural features, such as different power modes (hibernate, sleep, etc.) of different devices (e.g., processor cores) included in the device design. A few industrial file standards to define a design's power intent are (a) a Common Power Format (CPF) file and (b) a Universal Power Format (UPF) file. Along with different power modes, the power intent data may include transition conditions that describe signal conditions that invoke the transition from one power mode to a different power mode.

BRIEF DESCRIPTION OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, a software embodiment (including firmware, resident software, micro-code, etc.), including processing circuitry for executing thereof, or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

Figure 1:
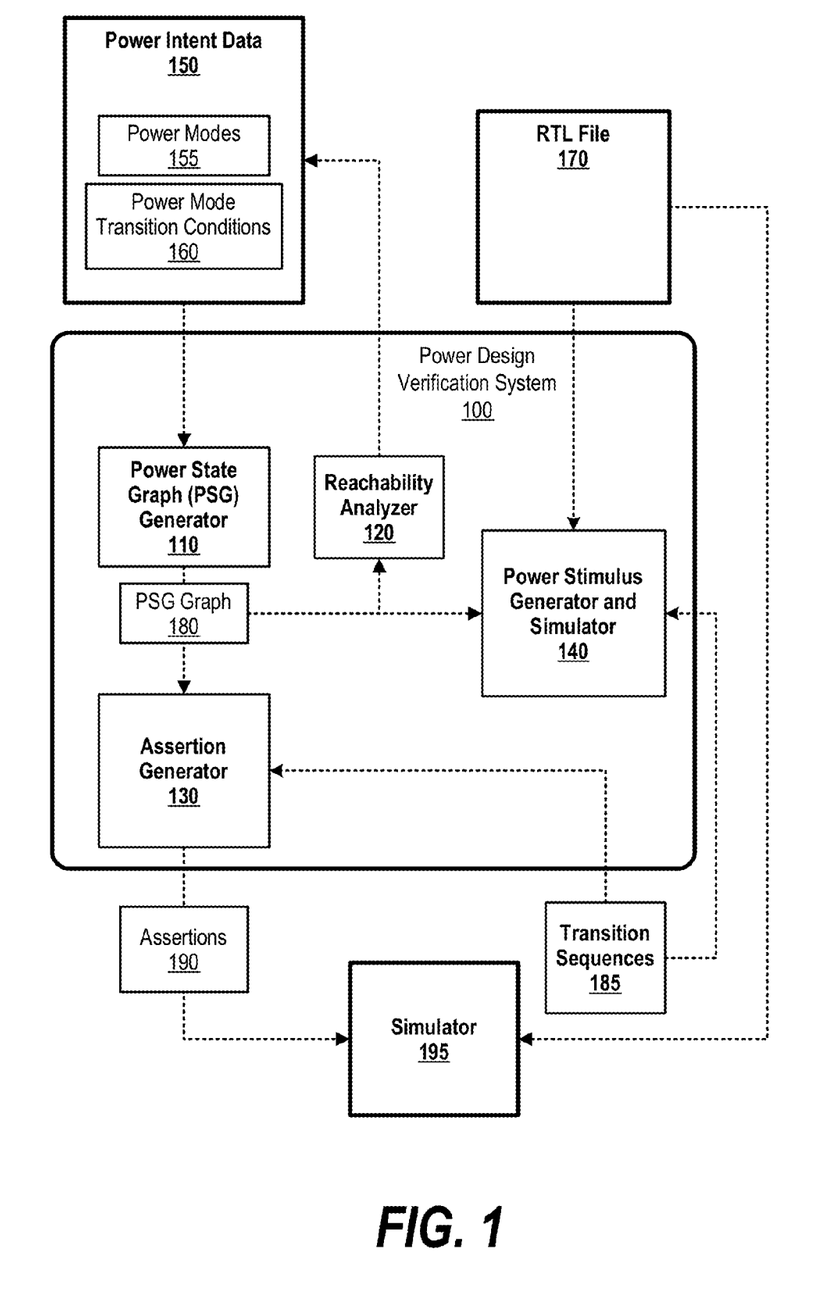
FIG. 1 is an exemplary diagram showing a design verification system verifying a design.

FIG. 1 is an exemplary diagram showing a power design verification system verifying a power design (e.g., a low power design, etc.) by 1) generating simulation stimuli for the power design; 2) analyzing power mode pair "reachability," and 3) generating simulation assertions to verify the power design.

Power design verification system 100 includes power state graph generator 110, reachability analyzer 120, assertion generator 130, and power stimulus generator and simulator 140 that, in one embodiment, may be individual software programs executing on a test system, including processing circuitry for executing code and memory for storing the code. In another embodiment, functions performed by these modules may be segmented in a different manner than that described herein.

Power state graph generator 110 retrieves power intent data 150, which corresponds to a power design described by RTL (register transfer level) file 170. Power intent data 150, which may be stored on a volatile or non-volatile storage area, includes power modes 155 and power mode transition conditions 160. Power modes 155 identify various power modes that correspond to the power design. In one embodiment, power intent data 150 may be a Common Power Format (CPF) file or a Universal Power Format (UPF) file. In another embodiment, the power design may include multiple processors that each have multiple power modes.

Power mode transition conditions 160 identify conditions (e.g., signal levels) that trigger a transition from one power mode to a different power mode. Power state graph generator 110 creates power state graph 180 by assigning a node to each of power modes 155 and assigning an edge (connects two nodes) to each of power mode transition conditions 160 (see FIG. 2 and corresponding text for further details). In one embodiment, power state graph generator 110 may generate a different type of data structure (e.g., a table) that represents the power modes and the transition conditions between the power modes.

The transition conditions correspond to input signals included in RTL file 170 (e.g. signal definitions 175), which power mode stimulus generator and simulator 140 utilizes to generate stimuli.

Figure 5:
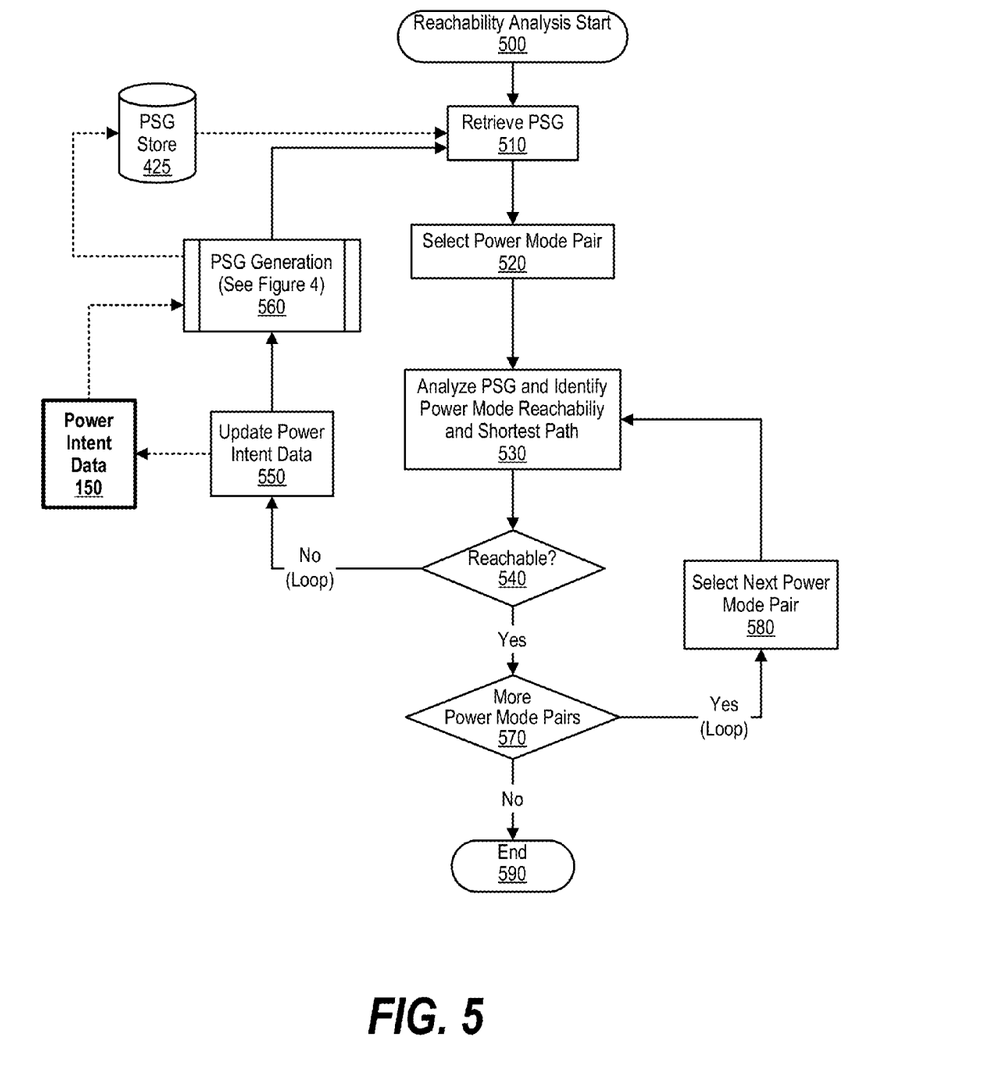
FIG. 5 is an exemplary flowchart showing steps taken in performing reachability analysis on a power state graph.

Reachability analyzer 120 analyzes power state graph 180 to identify a shortest "transition sequence" between two power modes (e.g., power mode 0 to power mode 4) and also determine whether a "dead-end" transition sequence exists, which is a transition sequence that starts at a beginning power mode (e.g., power mode 0) but does not have a transition sequence that enables the power design to revert back to the beginning power mode (see FIG. 5 and corresponding text for further details). When reachability analyzer 120 identifies a dead-end transition sequence, reachability analyzer 120 modifies power intent data 150 accordingly, such as adding additional power mode transition conditions to link an end node to a beginning node.

Power stimulus generator and simulator 140 utilizes transition sequences 185, power state graph 180, and RTL file 170 to generate simulation stimuli that invokes the power design to transition through the different power modes. Power mode transition conditions 160, which power state graph 180 defines as edges, identify signal conditions corresponding to input signals included in RTL file 170. Transition sequences 185 includes an ordered listed of power mode transitions that are tested during the simulation (see FIG. 7 and corresponding text for further details).

For example, assuming transition sequences 185 includes a transition sequence of pm0->pm1->pm3->pm0, and power state graph 180 includes transition conditions (e.g., signal X high, signal Y low) that specify signals that initiate such ordered power mode transitions, power stimulus generator and simulator 140 identifies one or more input signals described in RTL file 170 required invoke the transitions. In one embodiment, power stimulus generator and simulator 140 may require modifications of power intent data 150 and/or RTL file 170 accordingly when the simulation indicates a failure (see FIG. 7 and corresponding text for further details).

Assertion generator 130 utilizes power state graph 180 and transition sequences 185 to generate assertions 190. Simulator 195 simulates the power design (e.g., RTL file 170) and utilizes assertions 190 to verify valid power mode transition executions and/or screen for invalid power mode transitions during the simulation (see FIG. 6 and corresponding text for further details).

Figure 2:
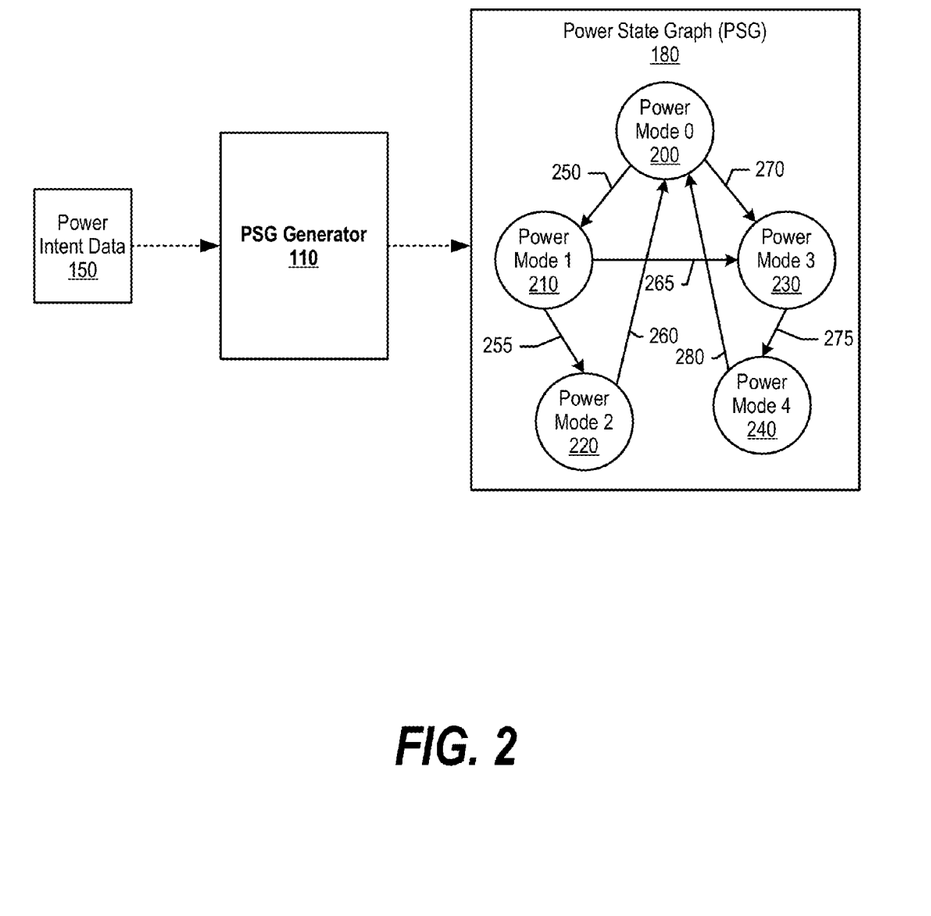
FIG. 2 is an exemplary diagram showing a power state graph generated from a power intent data.

FIG. 2 is an exemplary diagram showing a power state graph generated from a power intent data. Power state graph 180 includes nodes 200, 210, 220, 2340, and 240, which correspond to power modes 0, 1, 2, 3 and 4 included in power intent data 150.

Power state graph 180 links the nodes using edges 250, 255, 260, 265, 270, 275, and 280, which correspond to power mode transition conditions included in power intent data 150. For example, power intent data 150 may include a transition condition that invokes the power design to transition from power mode 2 (node 220) to power mode 0 (node 200). In this example, this transition condition is described by edge 260, which identifies one or more signals that invokes the transition (e.g., signal X high).

Figure 3:
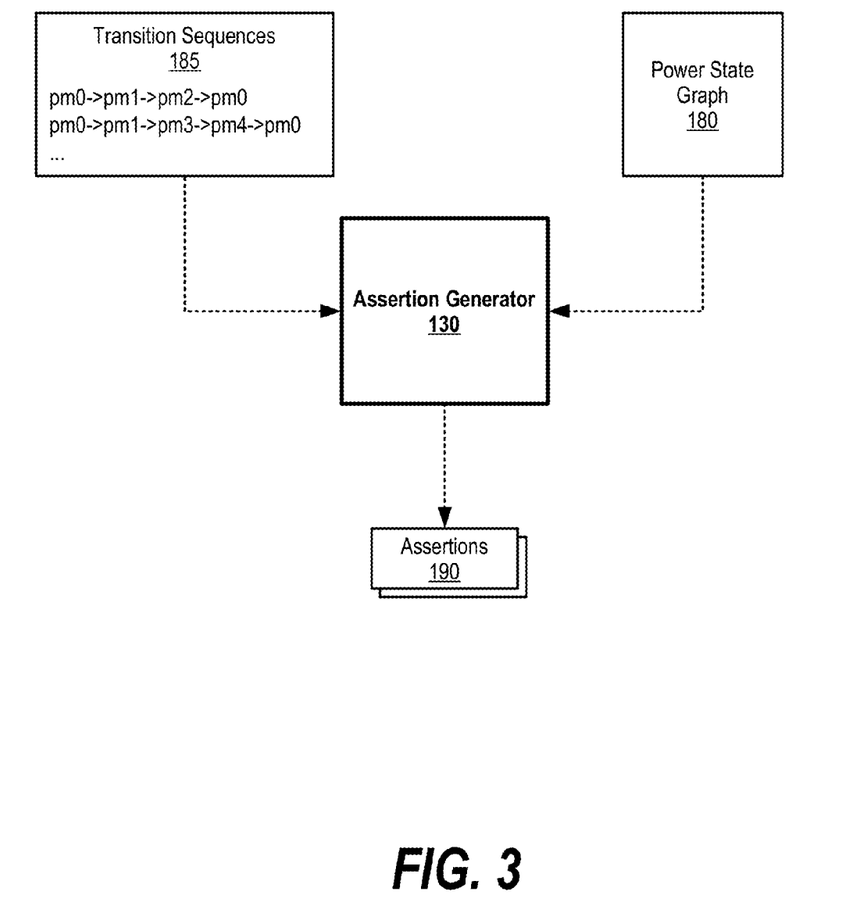
FIG. 3 is an exemplary diagram showing an assertion generator creating assertions based upon transition sequences and a power state graph.

FIG. 3 is an exemplary diagram showing an assertion generator creating assertions based upon transition sequences and a power state graph. Transition sequence 185 includes an ordered list of power mode transitions specified by, for example, a power circuit designer (e.g., "pm0, pm1, pm2, pm0").

Assertion generator 130 selects one of the transition sequences and analyzes the selected transition sequence against power state graph 180 to determine if the transition sequence is valid. For example, assuming the transition sequence is pm0, pm1, pm2, pm0, assertion generator 130 checks whether a transition sequence exists in power state graph 180 that allows transitions from pm0 to pm1 to pm2 and back to pm0.

When a transition sequence exists, assertion generator 130 determines whether an existing assertion is included in the power design's RTL file and, if not, generates one of assertions 190 to check the transition sequence during simulation. When a transition sequence does not exist, the transition sequence is determined invalid and assertion generator 130 generates one of assertions 190 to screen for the invalid power mode transition sequence during simulation.

Figure 4:
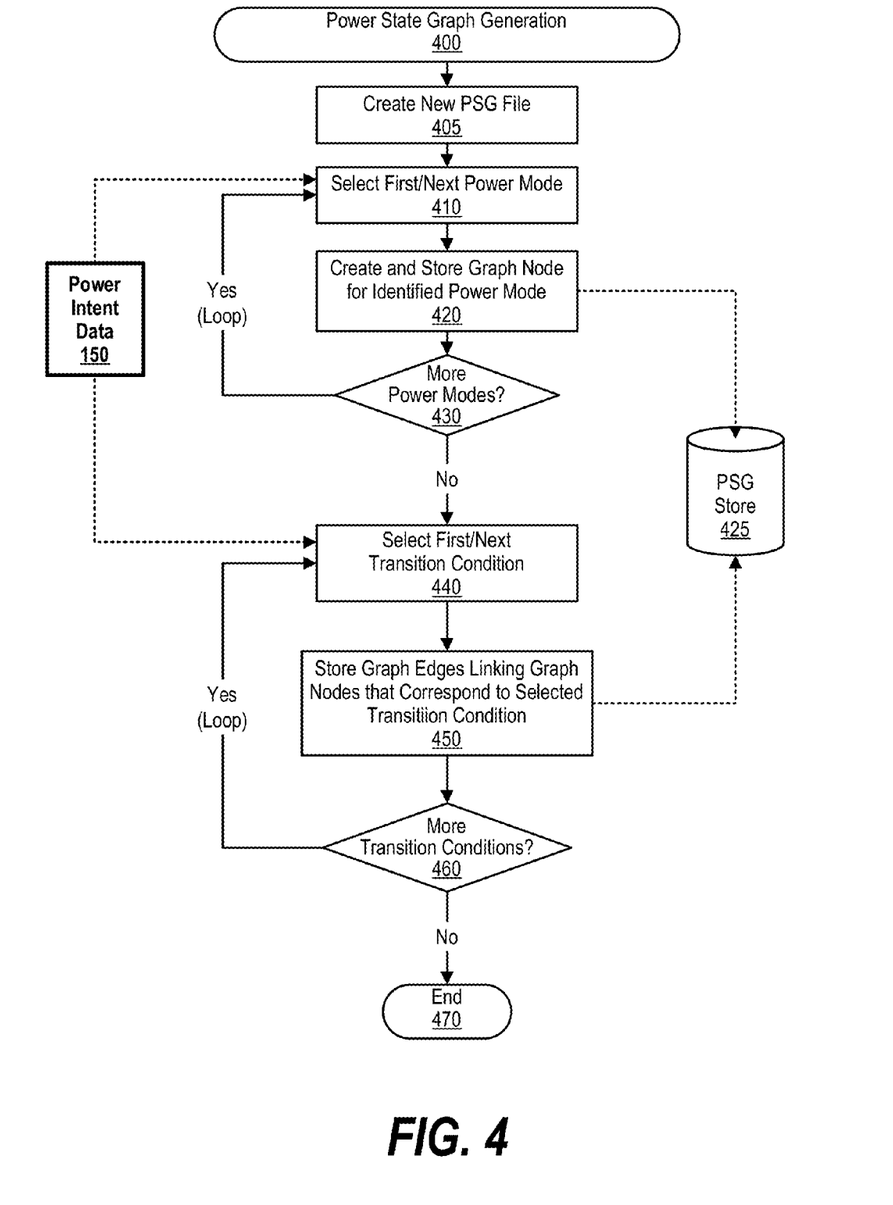
FIG. 4 is an exemplary flowchart showing steps taken in generating a power state graph.

FIG. 4 is an exemplary flowchart showing steps taken in generating a power state graph. Processing (e.g., power state graph generator 110 shown in FIG. 1) commences at 400, whereupon processing invokes a new power state graph file in power state graph store 425. At step 410, processing selects a first power mode that is included in power intent data 150 and stores a node that represents the selected power mode in the graph file (step 420).

A determination is made as to whether power intent data 150 includes more power modes (decision 430). If power intent data includes more power modes, decision 430 branches to the "Yes" branch, which loops back to select the next power mode and create a corresponding new node. This looping continues until a new node is created and stored in the graph file for each of the power modes identified in power intent data 150, at which point decision 430 branches to the "No" branch.

At step 440, processing selects a first transition condition in power intent data that defines a transition from one power mode to another power mode. Processing, at step 450, creates a graph edge that represents the transition condition and stores the edge in the graph file. The graph edge links a source node to a target node.

A determination is made as to whether power intent data 150 includes more transition conditions (decision 460). If power intent data includes more transition conditions, decision 460 branches to the "Yes" branch, which loops back to select the next transition condition and create a corresponding new edge. This looping continues until a new edge is created and stored in the graph file for each of the transition conditions identified in power intent data 150, at which point decision 460 branches to the "No" branch whereupon processing ends at 470. In one embodiment, the power state graph generation process may generate a different type of data structure (e.g., a table) that represents the different power modes and their corresponding transition conditions between the power modes.

FIG. 5 is an exemplary flowchart showing steps taken in performing reachability analysis (e.g., reachability analyzer 120 shown in FIG. 1) on a power state graph. In one embodiment, a power design verification system performs "reachability" analysis in order to 1) identify the shortest transition sequence from a beginning power mode to an ending power mode; 2) assess transition sequence feasibility; and/or determine whether the power state graph allows invalid transitions or reaches buggy states.

Processing commences at 500, whereupon processing retrieves the power state graph from power state graph store 425 at step 510. At step 520, processing selects a "power mode pair," which is a pair of power modes such as power mode 1 (beginning power mode) and power mode 3 (ending power mode).

At step 530, processing analyzes the power state graph and determines whether a transition sequence exists from the beginning power mode to the ending power mode and its shortest transition sequence. A determination is made as to whether a transition sequence exists in the power state graph (decision 540).

If a valid transition sequence does not exist in the power state graph, decision 540 branches to the "No" branch, which power intent data 150 requires updates at step 550. In turn, processing generates a new power state graph based upon updated power intent data 150 (pre-defined process block 560, see FIG. 4 and corresponding text for further details) and selects/analyzes power mode pairs in the new power state graph (steps 520 and 530). This looping continues until processing determines that the transition sequence exists, at which point decision 540 branches to the "Yes" branch.

A determination is made as to whether there are more power mode pairs to analyze (decision 570). If there are more power mode pairs to analyze, decision 570 branches to the "Yes" branch, which loops back to select (step 580) and process the next power mode pair. This looping continues until there are no more power mode pairs to analyze, at which point decision 570 branches to the "No" branch, whereupon processing ends at 590.

Figure 6:
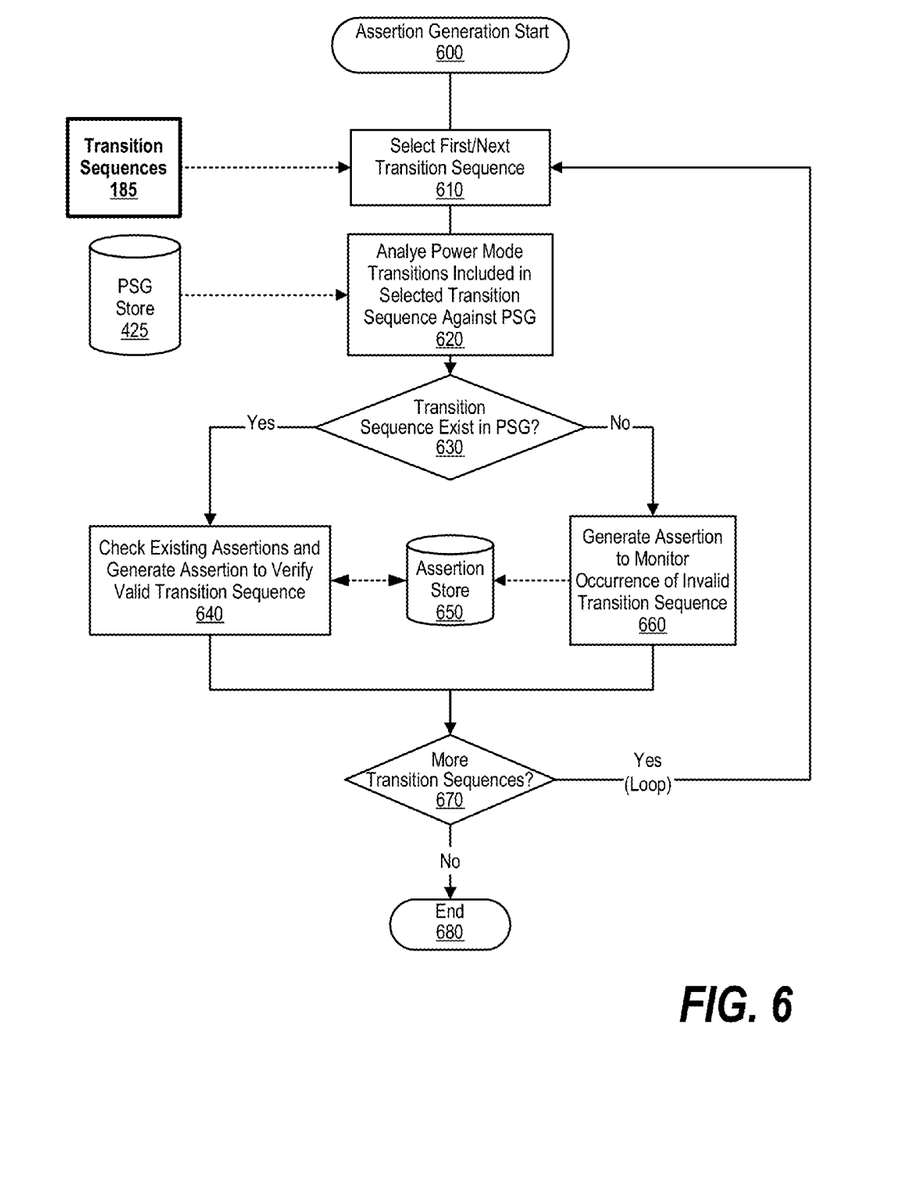
FIG. 6 is an exemplary flowchart showing steps taken in analyzing transition sequences and generating assertions that are utilized during simulation.

FIG. 6 is an exemplary flowchart showing steps taken in analyzing transition sequences and generating assertions that are utilized during simulation. Processing (e.g., assertion generator 130 shown in FIG. 1) commences at 600, whereupon processing selects a first transition sequence in transition sequences 185 at step 610.

At step 620, processing analyzes the power mode transitions included in the selected transition sequence against the power state graph stored in power state graph store 425 (e.g., feasibility of pm1, pm3, pm4, pm0). A determination is made as to whether the transition sequence exists in the power state graph (e.g., a valid transition sequence) (decision 630). If a transition sequence is valid, decision 630 branches to the "Yes" branch, whereupon processing checks existing assertions and generates a new assertion if required to verify the valid transition sequence (step 640).

On the other hand, if the transition sequence is invalid, decision 630 branches to the "No" branch, whereupon processing generates an assertion that screens for an occurrence of the invalid transition during simulation (step 660).

A determination is made as to whether there are more transition sequences to analyze in transition sequences 185 (decision 670). If there are more transition sequences to analyze, decision 670 branches to the "Yes" branch, whereupon processing loops back to select and process the next transition sequence. This looping continues until there are no more transition sequences to analyze, at which point decision 670 branches to the "No" branch, whereupon processing ends at 680.

Figure 7:
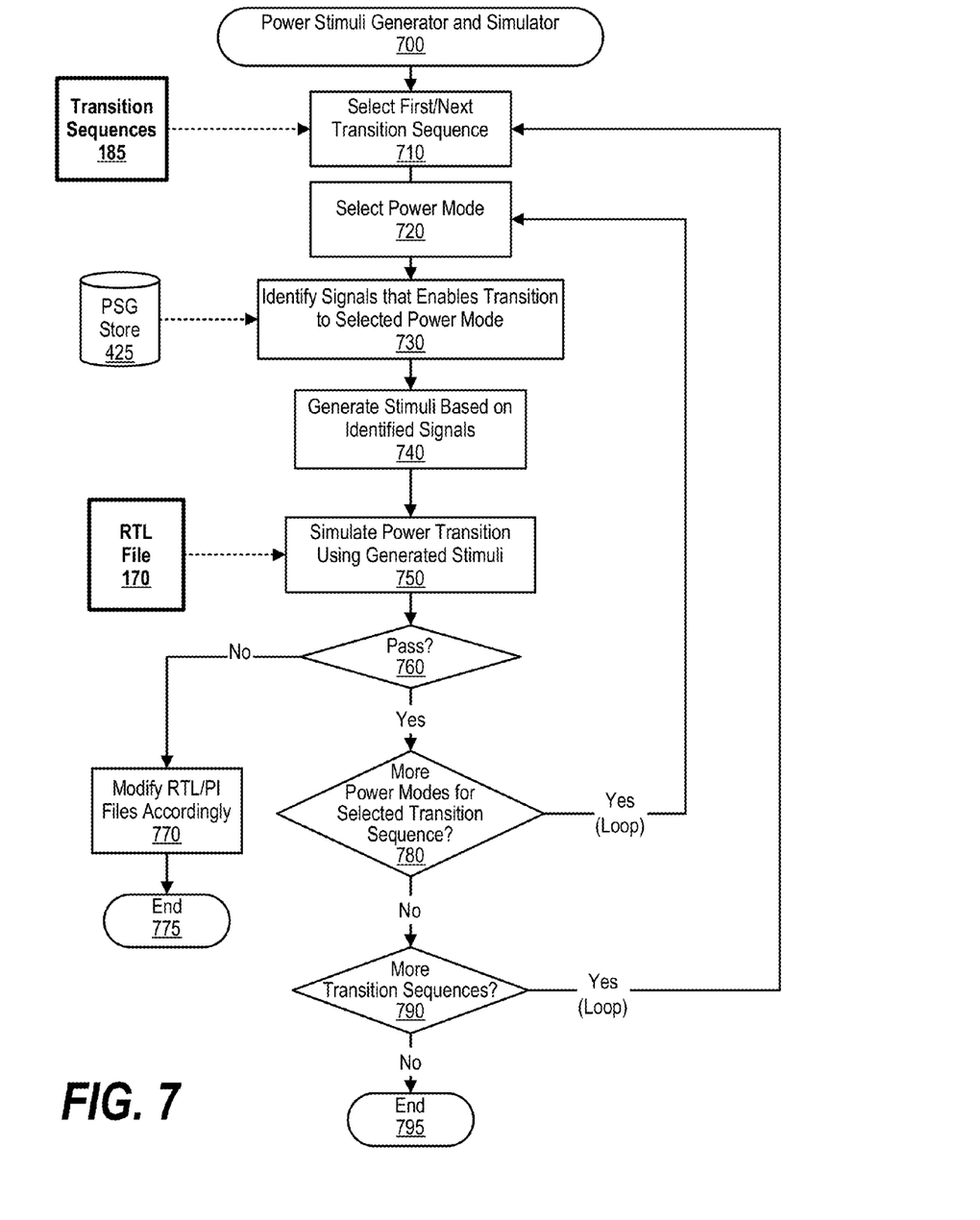
FIG. 7 is an exemplary flowchart showing steps taken in creating simulation stimuli and using the simulation stimuli to simulate the power design.

FIG. 7 is an exemplary flowchart showing steps taken in creating simulation stimuli and using the simulation stimuli to simulate the power design. Processing (e.g., power stimulus generator/simulator 140 and simulator 195 shown in FIG. 1) commences at 700, whereupon processing selects a first transition sequence from transition sequences 185 at step 710. Next, processing selects a power mode (e.g. the second power mode in the selected transition sequence) at step 720, and, at step 730, processing identifies signals that enables the transition to the selected power mode (e.g., the transition from the from the first power mode in the transition sequence to the second power mode in the transition sequence).

Next, processing generates stimuli based upon the identified signals at step 740. For example, assuming the current power mode is pm3 and the next power mode in the transition sequence is pm4, the transition from pm3 to pm4 is triggered by a condition "C." In this example, using formal analysis or constraint random stimuli generator based on the current simulation state, simulation stimuli are generated to enable condition "C" and drive the simulation from power mode pm3 to power mode pm4.

Processing simulates the power transition using the generated stimuli and RTL file 170 at step 750. A determination is made as to whether the simulation passed (decision 760). If the simulation did not pass, decision 760 branches to the "No" branch, whereupon processing modifies RTL file 170 and or the power intent data accordingly (creating a new power state graph) at step 770. Processing ends at 775.

On the other hand, if the simulation passes, decision 760 branches to the "Yes" branch, whereupon a determination is made as to whether there are more power modes in the selected transition sequence to simulate (decision 780). If there are more power mode transitions to simulate, decision 780 branches to the "Yes" branch, which loops back to select and process the next power mode. This looping continues until there are no more power mode transitions to simulate, at which point decision 780 branches to the "No" branch.

A determination is made as to whether there are more transition sequences in transition sequences 185 to evaluate (decision 790). If there are more transition sequences to evaluate, decision 790 branches to the "Yes" branch, which loops back to select the next transition sequence. This looping continues until there are no more transition sequences to evaluate, at which point decision 790 branches to the "No" branch, whereupon processing ends at 795.

Figure 8:
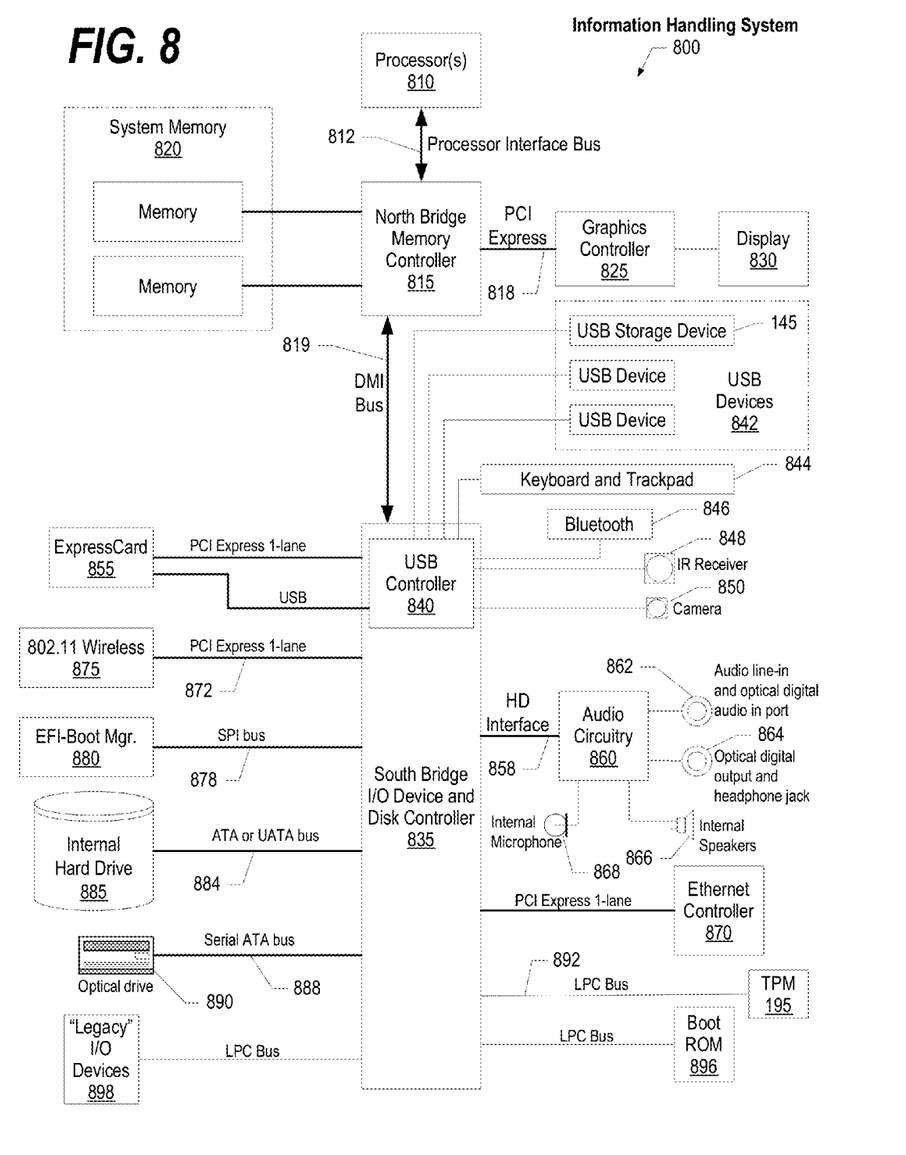
FIG. 8 is a block diagram of a data processing system in which the methods described herein can be implemented.

FIG. 8 illustrates information handling system 800, which is a simplified example of a computer system capable of performing the computing operations described herein. Information handling system 800 includes one or more processors 810 coupled to processor interface bus 812. Processor interface bus 812 connects processors 810 to Northbridge 815, which is also known as the Memory Controller Hub (MCH). Northbridge 815 connects to system memory 820 and provides a means for processor(s) 810 to access the system memory. Graphics controller 825 also connects to Northbridge 815. In one embodiment, PCI Express bus 818 connects Northbridge 815 to graphics controller 825. Graphics controller 825 connects to display device 830, such as a computer monitor.

Northbridge 815 and Southbridge 835 connect to each other using bus 819. In one embodiment, the bus is a Direct Media Interface (DMI) bus that transfers data at high speeds in each direction between Northbridge 815 and Southbridge 835. In another embodiment, a Peripheral Component Interconnect (PCI) bus connects the Northbridge and the Southbridge. Southbridge 835, also known as the I/O Controller Hub (ICH) is a chip that generally implements capabilities that operate at slower speeds than the capabilities provided by the Northbridge. Southbridge 835 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 896 and "legacy" I/O devices (using a "super I/O" chip). The "legacy" I/O devices (898) can include, for example, serial and parallel ports, keyboard, mouse, and/or a floppy disk controller. The LPC bus also connects Southbridge 835 to Trusted Platform Module (TPM) 895. Other components often included in Southbridge 835 include a Direct Memory Access (DMA) controller, a Programmable Interrupt Controller (PIC), and a storage device controller, which connects Southbridge 835 to nonvolatile storage device 885, such as a hard disk drive, using bus 884.

ExpressCard 855 is a slot that connects hot-pluggable devices to the information handling system. ExpressCard 855 supports both PCI Express and USB connectivity as it connects to Southbridge 835 using both the Universal Serial Bus (USB) the PCI Express bus. Southbridge 835 includes USB Controller 840 that provides USB connectivity to devices that connect to the USB. These devices include webcam (camera) 850, infrared (IR) receiver 848, keyboard and trackpad 844, and Bluetooth device 846, which provides for wireless personal area networks (PANs). USB Controller 840 also provides USB connectivity to other miscellaneous USB connected devices 842, such as a mouse, removable nonvolatile storage device 845, modems, network cards, ISDN connectors, fax, printers, USB hubs, and many other types of USB connected devices. While removable nonvolatile storage device 845 is shown as a USB-connected device, removable nonvolatile storage device 845 could be connected using a different interface, such as a Firewire interface, etcetera.

Wireless Local Area Network (LAN) device 875 connects to Southbridge 835 via the PCI or PCI Express bus 872. LAN device 875 typically implements one of the IEEE 802.11 standards of over-the-air modulation techniques that all use the same protocol to wireless communicate between information handling system 800 and another computer system or device. Optical storage device 890 connects to Southbridge 835 using Serial ATA (SATA) bus 888. Serial ATA adapters and devices communicate over a high-speed serial link. The Serial ATA bus also connects Southbridge 835 to other forms of storage devices, such as hard disk drives. Audio circuitry 860, such as a sound card, connects to Southbridge 835 via bus 858. Audio circuitry 860 also provides functionality such as audio line-in and optical digital audio in port 862, optical digital output and headphone jack 864, internal speakers 866, and internal microphone 868. Ethernet controller 870 connects to Southbridge 835 using a bus, such as the PCI or PCI Express bus. Ethernet controller 870 connects information handling system 800 to a computer network, such as a Local Area Network (LAN), the Internet, and other public and private computer networks.

The information handling system of FIG. 8 is capable of executing modules such as those shown in FIGS. 1-3. While FIG. 8 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 895) shown in FIG. 8 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 9.

Figure 9:
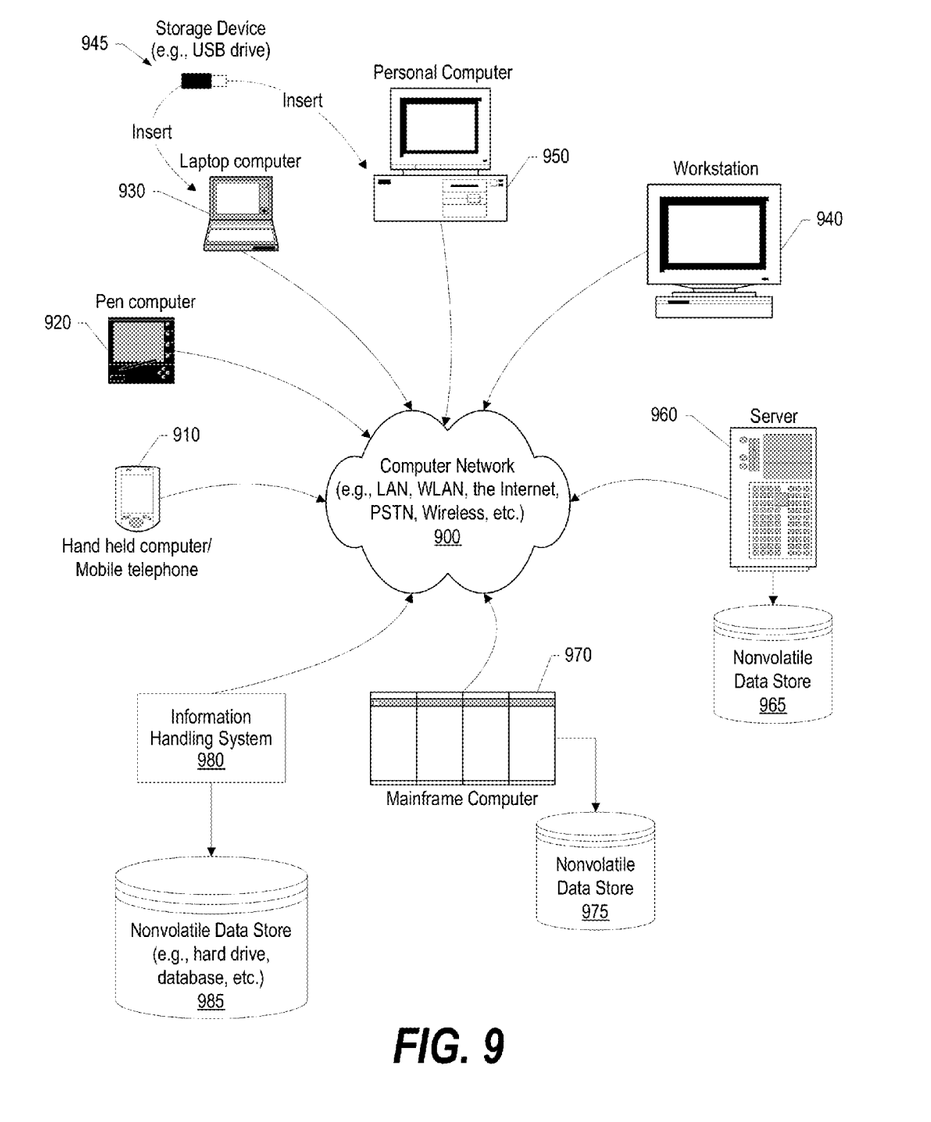
FIG. 9 provides an extension of the information handling system environment shown in FIG. 8 to illustrate that the methods described herein can be performed on a wide variety of information handling systems which operate in a networked environment.

FIG. 9 provides an extension of the information handling system environment shown in FIG. 8 to illustrate that the methods described herein can be performed on a wide variety of information handling systems that operate in a networked environment. Types of information handling systems range from small handheld devices, such as handheld computer/mobile telephone 910 to large mainframe systems, such as mainframe computer 970. Examples of handheld computer 910 include personal digital assistants (PDAs), personal entertainment devices, such as MP3 players, portable televisions, and compact disc players. Other examples of information handling systems include pen, or tablet, computer 920, laptop, or notebook, computer 930, workstation 940, personal computer system 950, and server 960. Other types of information handling systems that are not individually shown in FIG. 9 are represented by information handling system 980. As shown, the various information handling systems can be networked together using computer network 900. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 9 depicts separate nonvolatile data stores (server 960 utilizes nonvolatile data store 965, mainframe computer 970 utilizes nonvolatile data store 975, and information handling system 980 utilizes nonvolatile data store 985). The nonvolatile data store can be a component that is external to the various information handling systems or can be internal to one of the information handling systems. In addition, removable nonvolatile storage device 845 can be shared among two or more information handling systems using various techniques, such as connecting the removable nonvolatile storage device 845 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
   generating a power state graph based upon power intent data of a power design, wherein the power state graph comprises a plurality of edges based upon a plurality of power mode transition conditions included in the power intent data to transition between one or more of a plurality of power modes of the power design;
   updating the power intent data to include one or more new power mode transition conditions in response to determining that a transition sequence comprising one or more of the plurality of edges fails to exist in the power state graph from a selected first power mode to a selected second power mode, the selected first power mode and the selected second power mode included in the plurality of power modes;
   generating an updated power state graph based upon the updated power intent data;
   generating simulation stimuli based upon the updated power state graph; and
   simulating the power design utilizing the generated simulation stimuli.

2. The method of claim 1 further comprising:
   selecting an ordered list of a plurality of power mode transitions;
   matching the plurality of power mode transitions to one or more of the plurality of power mode transitions conditions;
   selecting one or more of a plurality of input signals that correspond to the matched one or more power mode transition conditions; and
   generating additional simulation stimuli based upon the selected one or more input signals.

3. The method of claim 1 further comprising:
   selecting an ordered list of a plurality of power mode transitions;
   determining whether the ordered list of the plurality of power mode transitions is valid compared to the updated power state graph;
   in response to determining that the ordered list of the plurality of power mode transitions is valid, verifying that an existing assertion verifies execution of the selected ordered list of the plurality of power mode transitions; and
   in response to determining that the ordered list of the plurality of power mode transitions is invalid, generating an assertion that monitors execution of the selected ordered list of the plurality of power mode transitions.

4. The method of claim 1 wherein the simulation utilizes an RTL file to simulate the power design, the method further comprising:
   determining that the power design fails the simulation; and
   modifying the RTL file in response to the failed simulation.

5. The method of claim 4 wherein the RTL file includes a plurality of processors that each correspond to the plurality of power modes included in the power intent data.

6. An information handling system comprising:
   one or more processors;
   a memory coupled to at least one of the processors;
   a set of computer program instructions stored in the memory and executed by at least one of the processors in order to perform actions of:
      generating a power state graph based upon power intent data of a power design, wherein the power state graph comprises a plurality of edges based upon a plurality of power mode transition conditions included in the power intent data to transition between one or more of a plurality of power modes of the power design;

updating the power intent data to include one or more new power mode transition conditions in response to determining that a transition sequence comprising one or more of the plurality of edges fails to exist in the power state graph from a selected first power mode to a selected second power mode, the selected first power mode and the selected second power mode included in the plurality of power modes;

generating an updated power state graph based upon the updated power intent data;

generating simulation stimuli based upon the updated power state graph; and simulating the power design utilizing the generated simulation stimuli.

7. The information handling system of claim 6 wherein the one or more processors perform additional actions comprising:

selecting an ordered list of a plurality of power mode transitions;

matching the plurality of power mode transitions to one or more of the plurality of power mode transitions conditions;

selecting one or more of a plurality of input signals that correspond to the matched one or more power mode transition conditions; and generating additional simulation stimuli based upon the selected one or more input signals.

8. The information handling system of claim 6 wherein the one or more processors perform additional actions comprising:

selecting an ordered list of a plurality of power mode transitions;

determining whether the ordered list of the plurality of power mode transitions is valid compared to the updated power state graph;

in response to determining that the ordered list of the plurality of power mode transitions is valid, verifying that an existing assertion verifies execution of the selected ordered list of the plurality of power mode transitions; and in response to determining that the ordered list of the plurality of power mode transitions is invalid, generating an assertion that monitors execution of the selected ordered list of the plurality of power mode transitions.

9. The information handling system of claim 6 wherein the simulation utilizes an RTL file to simulate the power design, the one or more processors performing additional actions comprising:

determining that the power design fails the simulation; and modifying the RTL file in response to the failed simulation.

10. A computer program product for simulating a power design, the computer program product comprising:

a non-transitory computer readable storage medium;

first program instructions to generate a power state graph based upon power intent data of a power design, wherein the power state graph comprises a plurality of edges based upon a plurality of power mode transition conditions included in the power intent data to transition between one or more of a plurality of power modes of the power design;

second program instructions to update the power intent data to include one or more new power mode transition conditions in response to determining that a transition sequence comprising one or more of the plurality of edges fails to exist in the power state graph from a selected first power mode to a selected second power mode, the selected first power mode and the selected second power mode included in the plurality of power modes;

fourth program instructions to generate an updated power state graph based upon the updated power intent data;

fifth program instructions to generate simulation stimuli based upon the updated power state graph;

sixth program instructions to simulate the power design utilizing the generated simulation stimuli; and wherein the first, second, third, fourth, fifth, and sixth program instructions are stored on the computer readable storage medium.

11. The computer program product of claim 10 further comprising additional program instructions stored on the computer readable storage medium to perform actions of:

selecting an ordered list of a plurality of power mode transitions;

matching the plurality of power mode transitions to one or more of the plurality of power mode transitions conditions;

selecting one or more of a plurality of input signals that correspond to the matched one or more power mode transition conditions; and generating additional simulation stimuli based upon the selected one or more input signals.

12. The computer program product of claim 10 further comprising additional program instructions stored on the computer readable storage medium to perform actions of:

selecting an ordered list of a plurality of power mode transitions;

determining whether the ordered list of the plurality of power mode transitions is valid compared to the updated power state graph;

in response to determining that the ordered list of the plurality of power mode transitions is valid, verifying that an existing assertion verifies execution of the selected ordered list of the plurality of power mode transitions; and in response to determining that the ordered list of the plurality of power mode transitions is invalid, generating an assertion that monitors execution of the selected ordered list of the plurality of power mode transitions.

13. The computer program product of claim 10 wherein the simulation utilizes an RTL file to simulate the power design, the computer program product further comprising additional program instructions stored on the computer readable storage medium to perform actions of:

determining that the power design fails the simulation; and modifying the RTL file in response to the failed simulation.

14. The computer program product of claim 10 wherein the RTL file includes a plurality of processors that each correspond to the plurality of power modes included in the power intent data.

* * * * *